United States Patent [19]
Austin

[11] 3,910,588
[45] Oct. 7, 1975

[54] SEALING WASHERS, AND FASTENER-SEALING WASHER ASSEMBLIES

[76] Inventor: George Alfred Braisby Austin, 3 Prior Road, Nobel Park, Victoria, Australia

[22] Filed: May 6, 1974

[21] Appl. No.: 467,439

[52] U.S. Cl. .................... 277/166; 85/1 JP; 151/37
[51] Int. Cl.² .................... F16J 15/10; F16B 29/00
[58] Field of Search.......... 277/166, 212 C; 85/1 JP, 85/50 R; 151/38, 37

[56] References Cited
UNITED STATES PATENTS
3,622,167  11/1971  Velthoven.......................... 85/1 JP
FOREIGN PATENTS OR APPLICATIONS
993,021  5/1965  United Kingdom.................. 85/1 JP Primary Examiner—Robert I. Smith
Attorney, Agent, or Firm—Robert W. Beart; Thomas W. Buckman

[57] ABSTRACT

The invention provides a sealing washer, made of a resilient material such as polyethylene or rubber, for fitting on the shank of a bolt or a screw and adapted to seal the opening in a roofing panel or wall sheet through which the bolt or screw is fitted, so as to prevent seepage of water through the opening, the sealing washer having means for gripping the head of the bolt or screw whereby the washer will be held firmly in engagement with the fastener once it has been assembled therewith.

2 Claims, 3 Drawing Figures

SEALING WASHERS, AND FASTENER-SEALING WASHER ASSEMBLIES

This invention relates to sealing washers, and it refers particularly to sealing washers for assembly with fasteners — such as bolts or screws — and to assemblies or combinations of fasteners and sealing washers.

It is an object of the invention to provide a sealing washer to fit about the shank of a fastener such as a bolt or screw, and adapted to grip the fastener so as to be retained in position thereon and constitute an assembly.

Another object is to provide a sealing washer which, when applied to a fastener such as a bolt or a screw, may be positively engaged with the head of the fastener so as to constitute an assembly.

Yet another object is to provide a sealing washer which may be assembled with a fastener such as a bolt or a screw by automatic assembly methods in such manner as to be retained in assembled relationship.

The invention devised with these and other objects in view provides a sealing washer adapted to be engaged on the shank of a fastener such as a bolt or a screw and having means for gripping engagement with the head of the fastener whereby the washer will be held firmly in engagement with the fastener once it has been assembled therewith.

Preferably, the sealing washer is made of a resilient material such as polyethylene or rubber and it has a bore or passageway in which the shank of the fastener is firmly engageable, a first bearing surface for engaging with the outer surface of the wall, roof or other structure with which the fastener is to be engaged, a second bearing surface for engagement with the underside of the head of the fastener, so as to effect a sealing engagement between the head of the fastener and the structure engaged by the fastener, and an outwardly extending shirt also for bearing on the surface of the wall, roof or other structure engaged by the fastener to provide an additional seal about the fastener.

In order that the invention may be readily understood and conveniently put into practical form we shall now describe a preferred construction of sealing washer with reference to the accompanying drawings, wherein.

Figure 1:
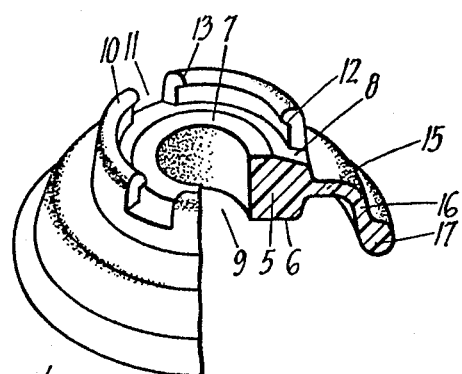
FIG. 1 is a view partly in perspective and partly in cross-section of the preferred construction of sealing washer made according to this invention.
Figure 2:
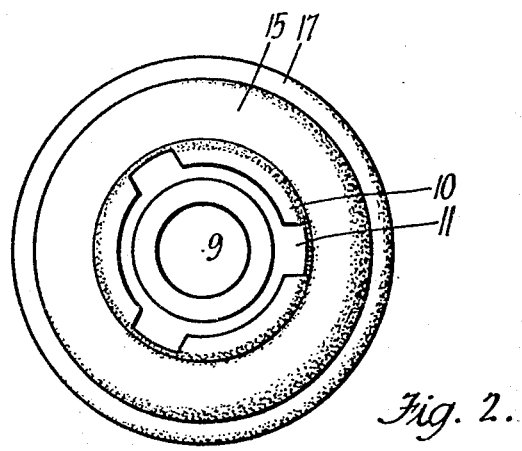
FIG. 2 shows a top plan view of the sealing washer.
Figure 3:
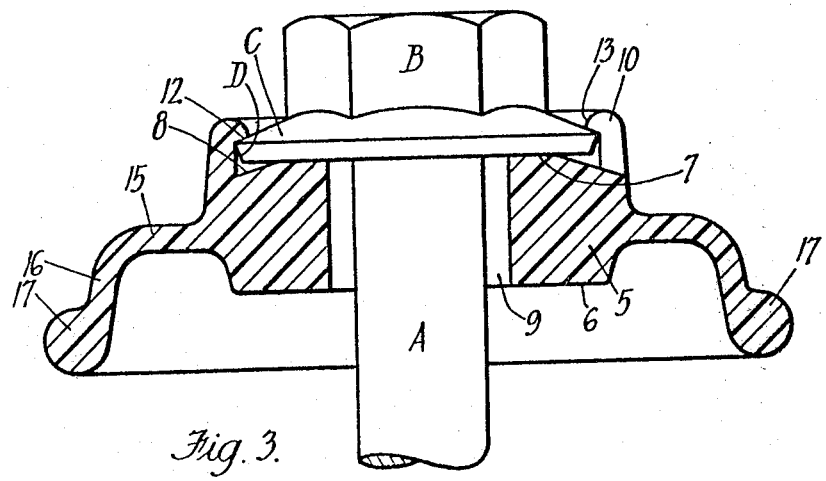
FIG. 3 is a cross-sectional view, on enlarged scale, of the sealing washer as fitted to the head portion of a bolt.

The sealing washer illustrated in these drawings has a body part 5 with an underside — that is inner — bearing surface 6 and an outer bearing surface 7 substantially parallel thereto, an inclined surface 8 extending outwardly and forwardly of the surface 7 and an axial opening in bore 9 through the body part. The bore 9 is a size to freely accommodate the shank A of a fastener having a head B provided with a circumferential, forwardly projecting flange C chamfered on its side edge at D. Extending rearwardly from the rear outer edge portion of the body part 5 is a circumferential rim 10 with several drainage slots 11 therein and having near its outer edge an inwardly-extending flange 12 which is curved at 13 to cooperate with the chamfered edge D of the bolt head flange C, whereby the sealing washer may be pressed into engagement with the bolt head B, and held in such engagement. The sealing washers are made to suit the bolts to which they are to be fitted, such that when the sealing washer is so engaged the outer bearing surface 7 is in contact with the underside of the bolt head.

Extending outwardly from the outerside of the body part 5 is a circumferential flange 15 which is curved forwardly to provide a skirt 16 terminating at its underside edge with an annular bead 17. The front edge of the bead 17 is forwardly of the bearing surface 6 and the bead 17 is adapted to bear upon the surface of the material into which the fastener shank A is to be engaged.

The sealing washer is made of a suitable resilient material, such as polyethylene or rubber, so that the skirt 16 and bear 17 will deflect as the fastener is tightened in position. When the fastener and washer combination is secured in position with the bearing surface 6 pressing upon the surface of the material into which the fastener is engaged the bear 17 will also press firmly upon that surface to provide a sealing ring about the washer body part 5.

The assembly of the washer on to the shank A of the fastener, and into gripping engagement with the flanged head B of the fastener, may be done in an automatic machine operative to apply such pressure as between the body part 5 and the head B as to effect engagement of the flange 12 with the head flange C.

Due to the flexibility of the sealing washer, and of the flange 15 skirt 16 and bead 17, it will provide for an effective seal of the shank A and head portion B, C of the fastener when the shank is engaged through a hole in the fibro-cement or other roof or wall sheeting.

It is to be appreciated that modifications may be made in details of design or construction. Thus, in some cases it may be desirable to have the washer a close fit in the shank A, in which case the bore 9 through the body part 5 may be of a size to provide a close fit. Also the size and shape of the rim 10 and of the flange 12 at its outer end will depend upon the size and shape of the head of the fastener with which the sealing washer is to be used. Further, the underside bearing surface 6 may be provided with a number of circumferential ribs to provide for virtual line contact between the body part 5 and the outer surface of the roof or wall sheeting or other structure with which the fastener is engaged.

All such modifications coming within the scope of the appended claims are to be deemed to be included in the ambit of the invention.

The embodiments of the invention in which an exclusive property or privilege is claimed are defined as follows:

1. A sealing washer for preassembled association with a fastener having a head and a shank, the washer including a body portion having an upper bearing surface and lower bearing surface, the upper bearing surface including an inclined surface portion extending downwardly and outwardly from the inner peripheral margin thereof, a rim portion extending upwardly from the outer marginal region of the inclined surface portion and adapted to surround the perimeter of the fastener head, the rim portion including inwardly extending flange means with the uppermost edge including means permitting the fastener head to be forced inwardly thereof so that the flange means snaps on top of at least a portion of the head means and thereby retaining the washer beneath the head of the fastener, the rim portion including peripherally spaced slots extending downwardly from the uppermost edge thereof to the inclined surface portion to facilitate drainage of water therefrom, a peripheral skirt portion extending downwardly and outwardly of the body of the washer to sealingly engage a workpiece wherein a joint formed by the fastener with a workpiece is effectively sealed through sealing engagement between the lower bearing surface and the workpiece as well as through sealing engagement between the peripheral skirt portion and the workpiece.

2. A sealing washer in accordance with claim 1, wherein the inner peripheral margin of the upper bearing surface is substantially planar and parallel to a substantially planar lower bearing surface.

* * * * *